Patented Dec. 28, 1943

2,337,628

UNITED STATES PATENT OFFICE 2,337,628

METHOD OF PRODUCING CATALYTIC MATERIAL

Walter A. Schulze and John C. Hillyer, Bartlesville, Okla., assignors to Phillips Petroleum Company, a corporation of Delaware No Drawing. Application February 21, 1941, Serial No. 380,070

12 Claims. (Cl. 252—259)

The present invention relates to adsorbent and/or catalytic materials containing or prepared from metal oxides, and to methods of preparing same. It relates more particularly to an improved method of making and drying metal oxide gels whereby superior products are obtained and the yield of usable material is increased. It further relates to the conversion of hydrocarbon materials in the presence of catalysts so prepared.

In the customary procedures for preparing oxide gels, an aqueous solution of a suitable metal salt is treated with a reagent capable of forming a more or less insoluble hydrous oxide of the metal. Thus silica gels may be formed by the addition of strong acids to silicate solutions and chromium oxide gels may be prepared by the addition of an alkali hydroxide to chromium salt solutions. Alumina gels may be formed by bases from aluminum salt solutions or by acids from aluminate solutions. In any case the primary object is the formation of a highly dispersed hydrous gel of high water content which maintains its structure during prolonged and complicated washing and drying steps.

A primary reaction product may be formed which is of satisfactory uniform gel structure. This form, which is termed a hydrogel, is usually converted with least trouble to a satisfactory dried gel form. On the other hand, if reaction conditions are not properly controlled, or if certain metal salts are employed, the reaction product may be in the form of a precipitate characterized by small, more or less gelatinous particles of non-cohesive structure.

In preparing some of the valuable catalytic metal oxide gels, such as those of aluminum, chromium, and zirconium oxides, a gelatinous precipitate is the normal primary reaction product. Certain metal oxides such as chromium, silicon, tungsten, and tin oxides may be easily obtained as hydrogels, but conditions of formation must be carefully controlled and/or elaborate and expensive preliminary steps are required to achieve desirable results.

In general, when the simpler and more convenient methods of formation are employed, such as simple addition of an alkali to a metal salt solution, the reaction product is a more or less gelatinous precipitate. This is true when preparing hydrous oxides of iron, aluminum, vanadium, copper, nickel, titanium, thorium, manganese, chromium or zirconium or mixtures of said oxides. Catalysts prepared from oxides of these materials are known to be useful for promoting many reactions. Many of them are especially useful for treating hydrocarbons, individually or in mixtures, as in various petroleum fractions; as by dehydrogenation to olefins, diolefins, aromatics, or the like, hydrogenation, both destructive and nondestructive, cracking, desulfurization, isomerization, and the like. Others may be used for the dehydration of alcohols, the removal of hydrogen halides from alkyl halides, and many other reactions.

Following the formation of the hydrous metal oxide, it is necessary to separate from it inorganic salts, which are contained in solution in water that is associated with the hydrous oxide and/or that is present as a supernatant liquid. This may be accomplished by means such as washing by decantation and/or filtration. The separated hydrous oxide is then dried in stages until the water content is reduced to a desired level. A final "activation" treatment is ordinarily employed, consisting of high-temperature treatment for a suitable period. In these steps of separation, drying and activation, many gelatinous precipitates often undergo serious deterioration in which the individual particles separate and crumble into small pieces. Such precipitates usually result in inferior dried products because the gel structure is absent or is more or less destroyed and the product is dense and of low porosity and mechanical strength. Excessive losses of material due to a high percentage of "fines" also result.

We have now discovered a novel method of preparation whereby the previously mentioned difficulties are eliminated. In our process, the initial formation of hydrogels is not essential and, in the case of those metal oxides which invariably form precipitates, a highly satisfactory dried oxide is obtained by our process, since the troublesome physical behavior of the precipitate in the washing and drying operation is effectively overcome.

In fact we have often found it advantageous to employ the simple and direct preparation methods which yield a hydrous metal oxide as a precipitate rather than the hydrogel, and to obtain the desired jelly-like structure through the addition of organic gel-forming substances.

We have discovered that when we incorporate certain hydrophilic organic colloidal substances in or with hydrous metal oxides we obtain a satisfactory hydrogel or an equally satisfactory mixture of gel and hydrous precipitate from which superior dried gel materials are obtainable. The organic colloid may be introduced either to the metal salt solution prior to formation of a hydrous oxide, or the precipitated hydrous metal oxide may be suspended in or mixed with a suitable solution of the organic colloid subsequent to the washing operations.

It is an object of our invention to provide improved catalysts.

A further object of our invention is to provide a process for the preparation of solid granular catalysts of the dried gel type.

Another object of our invention is to provide a process for the treatment of hydrous metal oxides to produce catalysts therefrom.

Still another object of our invention is to provide a process for the catalytic treatment of hydrocarbon materials.

An object of our invention is to provide a process for the dehydrogenation of hydrocarbons.

Further objects and advantages of our invention will be apparent from the accompanying disclosure.

In one specific embodiment of our invention, a precipitated hydrous metal oxide, such as a gelatinous precipitate of aluminum oxide which has been washed free of inorganic salts by decantation and/or filtration is suspended in a hot aqueous solution of gelatin, and the suspension is allowed to cool to a temperature which permits the gelatin to solidify. The cooled mass may then be cut or otherwise broken into cubes or other particles of such size that the shrinkage during drying will produce or result in granules of a suitable mesh-size. The presence of the gelatin prevents or inhibits further cracking or splitting with formation of fines during drying.

Gelatin may be used in our process, but many other gel-forming organic substances are satisfactory. Agar is another useful colloidal material, and in some cases vegetable gums such as gum tragacanth, gum arabic, ammoniacum (gum ammoniac), galbanum, gamboge, myrrh, or other water-soluble or emulsifiable natural or synthetic vegetable gums are satisfactory. In general, aqueous solutions of these gel-forming or colloidal organic substances are fairly firm and rigid gels below some particular temperature and are more or less liquid above such a temperature.

The organic gel-forming material may be added to the metal salt solution before precipitation in some cases, but the high concentration of inorganic salts present will often coagulate the organic material and prevent the subsequent formation of a suitable product. We find that in preparing our gels with gelatin or with agar or the like it is generally most satisfactory to resuspend or intimately mix the metal oxide in a hot solution of the organic colloid, after the oxide has been formed and thoroughly washed. When certain gums are employed they may be added directly to the metal salt solution prior to oxide formation.

We prefer to suspend the precipitated metal oxide in such a quantity of the solution of organic gel-forming substance that the particles are just covered when broken up well or stirred in. Of course, a hard compacted filter cake can be covered with a minimum amount of such a gelatinizable solution, but in such a case the metal oxide is ordinarily not well dispersed into the organic colloid solution. We have found it most satisfactory to break up the filter cake of metal oxide into the estimated minimum quantity of gelatin solution, and often to promote dispersion by mechanical agitation. Additional gelatin solution may be added if necessary, or some decanted away if too much is initially used.

When the metal oxide is washed merely by decantation the soft voluminous mass of precipitate usually need only be covered with the gelatin solution, or possibly mechanically agitated, to secure a satisfactory degree of dispersion. In many instances mixtures of hydrous oxides of two or more metals may be used, to advantage, as is known.

The metal oxide gel, or hydrous metal oxide precipitate, according to our process is merely dispersed in an aqueous solution, and is not in any way peptized or redissolved as has been proposed by others. We find that the added strength and coherence produced by the added organic colloid results in a product superior to that obtained by the process of peptizing the once-precipitated metal oxide and allowing it to form a hydrogel in the absence of such an organic material.

The concentration of organic colloid used to produce satisfactory gels may be varied, but usually solutions containing from 1 to 10% gelatin or of the other substances named are preferred. However, since the large amount of metal oxide present effectively dilutes the organic colloid solution, a solution of such strength that the concentration of colloid or gum based on the final undried weight, after removal of excess water, is between 3 and 5% has been found to yield the best results. Gels of weaker concentration are ordinarily not sufficiently rigid for practical use, while no advantage is gained from higher concentrations. As a general rule, concentrations of each organic substance are used which will yield gels of suitable rigidity, and such quantities can readily be determined by trial by one skilled in the art, for any particular product in the light of the present disclosure.

A gelatin solution is ordinarily used hot, that is to say, above 95° F. and preferably in the neighborhood of 212° F. Above 95° F. all concentrations of gelatin will be liquid and weak solutions will remain liquid to still lower temperatures. When agar or other gelatinizing substances are used the minimum permissible temperature will be somewhat different but temperatures of 180–212° F. are ordinarily satisfactory. Somewhat higher temperatures may be used at times, but a temperature so high as to have a deleterious effect on the material being used should be avoided.

Following the step of addition of the organic colloid solution and the dispersion of the metal oxide therein the mixture is cooled and allowed to set. The temperature should be below 95° F. when using gelatin and is preferably in the range of 60 to 75° F. Even lower temperatures down to about 32° F. may be required when using weak gelatin solutions, but a freezing of the mixture with formation of ice generally results in an inferior product and is to be avoided. In general the range of about 60° to 75° F. is satisfactory for practically all organic colloids.

After the gel has set, we prefer to grade it into pieces which will yield particles of the proper mesh-size after the great shrinkage which occurs on drying. For this purpose it is convenient to allow the gel to set in thin sheets of a thickness equal to the cross-sectional area of the particles into which the gel is to be cut. The gel is then cut by any convenient means such as passage through a coarse mesh screen, or in any other way broken into pieces having a more or less cubical shape.

These pieces are dried to reduce the water content and produce the hard, porous, catalytic or adsorbent gel material. After the incorporation of our organic colloids, the preliminary drying must be carried out below the softening point of the gel, i. e., usually at 60 to 75° F. This may be accomplished by air-drying for a suitable period, or by vacuum drying or other means. When the preliminary drying is complete, the particles are greatly reduced in size, a very large percentage of the moisture is gone, and the hydrogel no longer exists as such, but may be described as a dried, or partially dried gel. At this point, the temperature may be raised without a melting of the partially dried gel occurring. We prefer to finish the drying at elevated temperatures of 200 to 250° F., either in an oven, by passing a hot stream of gas over the catalyst, by passing the catalyst on a belt over a hot blast, or other means obvious or known to those skilled in the art.

The dry-appearing gel may be further dehydrated, and activated, by conventional means such as slow heating to more elevated temperatures, such as in the range of about 600 to 1000° F. Following such dehydration and activation treatment a further heat treatment may be given this catalyst to eliminate the organic colloid, in such cases where this is desirable or necessary. This can be done by maintaining the temperature in the range of about 700 to 1100° F. while passing a slow current of a gas containing free or reactive oxygen, such as air, which may or may not be diluted with inert gases, over the body of catalyst. The operation is entirely analogous to the treatment or regeneration of mineral catalysts to remove carbon deposits and may be carried out in any manner satisfactory for such regeneration. The elimination of the organic material by combustion still further increases the porosity of the dried gel, decreases the apparent density and yields a catalyst of superior properties.

In preparing a catalyst it may be desired to grade the gel particles by some other method than cutting the hydrous gel, such as extrusion of the gelatinous mass into rod-like forms which are then broken or cut up to form pellets. In such a case we prefer to carry out our process in a manner slightly different from that used in the preparation of granular catalysts.

When using such an extrusion process, a soft mass such as the hydrous gelatinous precipitate of metal oxide is desirable rather than a rigid hydrogel. However, such a mass, particularly if it has been washed on a filter, or has lost some of its adsorbed water, is not sufficiently cohesive to allow such extrusion without a large proportion of the pieces crumbling to fines. In this operation we find the addition of a small percentage of an organic colloid, of the type described, to be extremely beneficial in increasing the cohesiveness of the particles. However, the concentration of said colloidal material is kept below values which form a rigid gel-like mass.

We prefer to use substances such as natural gums, synthetic gums, and the like in preference to such colloids as agar or gelatin in forming extrudable material. These are added directly to the metallic salt solution in proper proportion, suitably about 1 to 10% by weight of the resulting metal oxide, but before precipitation of the said oxide. The precipitation is carried out in the normal manner, whereby a large percentage of the added organic gum is adsorbed by the precipitate. Sizing by extrusion or if desired by any other means such as pelleting is carried out following washing. Due to the presence of the organic colloid the sized material holds together without undue breakage and drying in air does not cause further crumbling. Drying is carried out as before, followed by activation and combustion to burn out the organic material.

Gels of high porosity may often be prepared by the addition of carbon black to the metal salt solution whereby the carbon black is carried down by the gelatinous precipitate and is subsequently burned out. Obviously the process of our invention is applicable to preparations of this type. It is even more desirable to have organic gel-forming substances present in such gels than in the preparation of pure metallic oxides because of the somewhat less gelatinous nature of the precipitate containing considerable amounts of carbon black. In such instances also, the organic material may replace a certain proportion of the carbon black used, or can if desired be used as a means of introducing still larger proportions of carbon black than would otherwise be possible.

Often, depending somewhat upon the process in which the catalyst is to be used, it will not be necessary to remove the organic colloid from the dried material. In some instances it will be found desirable to deliberately leave it in as a definite part of the final catalyst. When the organic colloid is left in as a constituent of the final catalyst, the catalyst should not be used under such conditions that the organic material will decompose or char sufficiently to result in a mechanical deterioration of the solid particles. Such a catalyst containing the organic colloid can not be used to promote reaction wherein reactants are present which will react with such organic material. When it is desired to produce catalysts from hydrous metal oxides which are not completely gelatinous, or which may even be almost devoid of gelatinous physical properties, our invention may be successfully applied to produce catalysts suitable for use at low temperatures. Thus, as one example, precipitated hydrous nickel oxide is often not extremely gelatinous, but may be treated in accordance with our invention, the resultant gel dried at a temperature sufficiently low to obviate charring of the organic matter, and the final granular material used as a catalyst for low-temperature hydrogenations, such as the saturation of olefinic bonds with free hydrogen. In those cases where the catalyst particles are not materially disrupted by a more or less extensive charring of the organic colloidal material and the presence of the charred remains is not deleterious to the final catalyst, this material need not be removed by burning even when the catalyst is to be used at somewhat elevated temperatures. Thus when an aluminum oxide or a chromium oxide catalyst is to be used for the conversion of hydrocarbons, as in the desulfurization of petroleum fractions or in dehydrogenation processes, and the like, such organic material need not be burned out prior to use in all cases.

It is the intent of this disclosure that the granular materials which are produced by the following teachings contained herein may be used directly as catalysts. However, in many cases the same initial quantity of material may provide much larger quantities of final catalytic material of substantially the same catalytic activity per unit quantity by incorporating therewith various granular materials. Such granular materials should be more or less porous or pervious, and their particle size should be appreciably smaller than the particle size desired for the final catalytic material. Suitable supports may be selected from pumice, unglazed porcelain, various clays, and earths such as kaloin, kieselguhr, fuller's earth, bauxite, and synthetic materials such as charcoal, silica gel, alumina, and others known to the art. Such materials will often exert no catalytic influence themselves under the reaction conditions for which the final catalyst is used, while in other cases they may be found to have desirable promoting effects. When producing granular catalysts without extrusion, pelleting, or the like, such supports may have rather large particle sizes, although smaller than the eventual catalyst, and should be intimately mixed with the hydrogel, or may be mixed with the hydrosol before setting to a gel occurs. In such cases, before drying, each particle of the supporting material will have a more or less thick coating of gelatinous material. When the catalyst is produced by extrusion, pelleting, or the like, the supporting material should be somewhat powdery or mealy, so that final catalyst particles will contain numerous particles of supporting material. In some cases supporting materials of small particle size may be used when granules are produced without extrusion in manners hereinbefore described.

Numerous examples might be given of the preparation of various catalytic materials comprised within the scope of this invention, but the following are sufficiently indicative to show the improved results obtained. They are in no sense to be interpreted as limiting the scope of this invention.

*Example I*

One part by weight of aluminum chloride was dissolved in twenty parts by weight of water. This solution was heated to 160–180° F. and an excess of ammonium hydroxide added with continuous agitation to precipitate a very gelatinous mass of alumina. The supernatant solution was decanted through a filter, and the alumina was washed by treating with an equal volume of hot water, settling and decanting through the filter. Five washings were sufficient to give a precipitate substantially free from salts. The precipitate was then treated with a hot (180° F.) solution of 10% gelatin solution. A volume of solution just sufficient to suspend the alumina was used. The alumina was stirred well to distribute it uniformly, and the resulting mixture had a gelatin strength of approximately five per cent.

The thick suspension was spread out on trays in a layer approximately one-half-inch thick and allowed to cool to 160° F. The hydrogel which resulted was removed from the trays, cut into one-half-inch cubes by means of a section of wire screen of one-half-inch mesh, and the cubes allowed to dry in an air stream for a period of three days at approximately 75° F. At the end of this time the cubes had shrunk greatly and were of a uniform 6 to 8-mesh size. Only a very small percentage had split and broken down to finer particles. These grains of alumina were then dried in an oven at 240° F. for two hours, and then placed in a glass tube and the temperature slowly raised by means of an electrically heated furnace to 800° F. The furnace was so controlled that this temperature was reached after four hours, and a slow stream of inert gas was passed through to carry out the water. A small percentage of oxygen was then admitted to the gas stream. After completion of the combustion the resultant catalyst was cooled and ready for use. It was a white, highly porous very light, granular material, hard and resistant to handling and very active in such reactions as dehydrogenation and desulfurization of hydrocarbons and petroleum fractions.

*Example II*

A solution containing five parts of aluminum chloride to one hundred of water was heated to 200° F. and to it was added two parts of gum tragacanth. When this was dissolved, the solution was cooled to approximately 140° F. and the alumina precipitated with an excess of ammonium hydroxide. The gum was largely adsorbed. The precipitate was separated from the remaining solution. It was extruded through a metal plate having holes one-half-inch in diameter and the rods so formed were cut off in half-inch lengths. The gum caused a cohesive mass to be formed which could be easily handled. The extruded particles were air-dried for three days, then dried in an oven at progressively higher temperatures as in the previously described example. During the high-temperature treatment the ammonium chloride salt was volatilized. Subsequently the gum tragacanth was burned out by a procedure such as described in the previous example. The resultant material was a highly porous granular contact catalyst which was very active, especially for the conversion of petroleum fractions at high temperatures and low pressures. Thus, a natural gasoline fraction, with an octane number of about 60 and containing sulfur compounds is passed over the catalyst at a low pressure and a temperature just over 1000° F. Practically all of the sulfur compounds are decomposed with the formation of hydrogen sulfide. Dehydrogenation also takes place, so that the resulting gaseous stock has an octane number about 6 units greater than the original natural gasoline.

*Example III*

Hydrous chromium oxide was precipitated, washed and resuspended in a hot solution of agar. The proportion of agar solution was regulated to result in a gel containing 5 per cent of agar based on the undried weight of chromium oxide. The gel was dried and converted to a low-density gel catalyst of superior activity for the dehydrogenation of low-boiling hydrocarbons to form the corresponding olefins and diolefins. Thus, this gel catalyst is reduced in an atmosphere containing hydrogen while being heated up to about 1100° F., and is then cooled to about 850° F. Starting at this temperature, it effects approximately equilibrium conversion of butanes to butylenes and free hydrogen for several hours. The same extent of conversion is carried out for a considerably longer period by gradually raising the temperature as the catalyst loses activity, to a maximum of about 1000° F., after which the catalyst is regenerated by a careful burning out and used again.

*Example IV*

Equal weights of carbon black and aluminum chloride were placed in a warm solution and the alumina precipitated with excess ammonium hydroxide. After several washings by decantation, the gelatinous mass was dispersed by agitation into a hot 10 per cent gelatin solution. The resulting gel was air-dried, then heated to burn out both carbon black and gelatin along with residual ammonium chloride. The alumina so obtained had an apparent density of 0.4 and superior physical properties.

Example V

Titanium oxide was precipitated in the presence of 3 per cent by weight of gum arabic. The washed and cooled gel was sized, air-dried and heated to ignition temperatures to burn out the organic material.

Example VI

Zirconium oxide was precipitated, washed and filtered and then dispersed in a hot gelatin solution to produce a gel containing 5 per cent of gelatin based on the weight of undried zirconium oxide. The cooled gel set at 75° F., and was air-dried, then heated and activated at a temperature of 700° F. At this temperature a stream of gas containing oxygen was passed through the zirconia particles to burn out the gelatin. The catalyst thus produced had an apparent density of 1.2 and losses to fines was less than 5 per cent.

A zirconia gel prepared without the gelatin had an apparent density of 1.6, and loss to fines was about 25 per cent.

It is obvious that various modifications may be made in the practice of our invention as described and in the method of utilizing the improved metal oxide catalysts obtainable thereby without departing from the scope of the invention as defined in the appended claims.

We claim:

1. A process for the preparation of metal oxide catalysts, which comprises preparing a hydrous metal oxide, washing said hydrous oxide to remove water-soluble inorganic salts, suspending said washed hydrous oxide in an aqueous solution of a hydrophilic organic colloid above the setting temperature thereof, cooling the resulting mixture to produce a semi-rigid cohesive hydrous gel, drying said gel at a temperature below said setting temperature until the material assumes a heat-stable gel form, heating the resultant heat-stable gel material in the absence of an oxidizing gas to a temperature within the range of 600 to 1000° F. and maintaining said temperature for a time sufficient to effect substantially complete dehydration thereof, and subsequently passing over the dried gel at a temperature between 700 and 1100° F. a gas containing reactive oxygen to oxidize and remove the organic matter to produce a hard, porous, granular adsorbent metal oxide of low apparent density.

2. A process for the preparation of a metal oxide catalyst, which comprises preparing a hydrous metal oxide, washing said hydrous oxide to remove water-soluble inorganic salts, suspending said washed hydrous oxide in an aqueous solution of a hydrophilic organic colloid selected from the group consisting of gelatin, agar, gum arabic and gum tragacanth, above the setting temperature of said colloid, cooling the resulting mixture to produce a semi-rigid cohesive hydrous gel, drying said gel at a temperature below said setting temperature until the material assumes a heat-stable gel form, heating the heat-stable gel material in the absence of an oxidizing gas to a temperature within the range of approximately 600° to approximately 1000° F., and maintaining said temperature for a time sufficient to effect substantially complete dehydration thereof, and subsequently passing over the dried gel at a temperature between approximately 700° and approximately 1100° F. a gas containing reactive oxygen to oxidize and remove the organic matter to produce a hard, porous, granular absorbent metal oxide of low apparent density.

3. The process of claim 1 in which the organic colloid is gelatin.

4. The process of claim 1 in which the organic colloid is a vegetable gum.

5. The process of claim 1 in which the weight of organic colloid is between 3 and 5 per cent of the weight of undried hydrous metal oxide.

6. The process of claim 1 in which the organic colloid is agar.

7. A process for the preparation of an aluminum oxide catalyst suitable for the catalytic conversion of hydrocarbons at an elevated temperature, which comprises effecting an intimate dispersion of hydrous aluminum oxide in an aqueous medium containing a hydrophilic organic colloid selected from the group consisting of gelatin, agar, gum arabic, and gum tragacanth, in an amount between approximately 1 and approximately 10 per cent by weight of said hydrous aluminum oxide, drying said dispersion at a temperature below the liquefaction temperature of the resulting mixture to form a hard, heat-stable gel, subsequently drying said heat-stable gel at an elevated temperature between approximately 600° and approximately 1000° F., and finally passing a gas containing reactive oxygen over the resultant dried material at a temperature between approximately 700° and approximately 1100° F. to oxidize and remove organic material and produce a hard, porous, granular, adsorbent aluminum oxide catalyst.

8. A process for the preparation of an aluminum oxide catalyst suitable for the catalytic conversion of hydrocarbons at elevated temperatures, which comprises effecting an intimate dispersion of hydrous aluminum oxide in an aqueous medium containing gelatin in amount between 1 and 10 per cent of said hydrous aluminum oxide, drying said dispersion at a temperature below the liquefaction temperature of the resulting mixture to form a hard, heat-stable gel, subsequently drying said heat-stable gel at an elevated temperature between 600 and 1000° F., and finally passing a gas containing reactive oxygen over the resultant dried material at a temperature between 700 and 1100° F. to oxidize and remove organic material and produce a hard, porous, granular, absorbent aluminum oxide catalyst.

9. A process for the preparation of a chromium oxide catalyst suitable for the catalytic conversion of hydrocarbons at an elevated temperature, which comprises effecting an intimate dispersion of hydrous chromium oxide in an aqueous medium containing a hydrophilic organic colloid selected from the group consisting of gelatin, agar, gum arabic, and gum tragacanth, in an amount between approximately 1 and approximately 10 per cent by weight of said hydrous chromium oxide, drying said dispersion at a temperature below the liquefaction temperature of the resulting mixture to form a hard, heat-stable gel, subsequently drying said heat-stable gel at an elevated temperature between approximately 600° and approximately 1000° F., and finally passing a gas containing reactive oxygen over the resultant dried material at a temperature between approximately 700° and approximately 1100° F. to oxidize and remove organic material and produce a hard, porous, granular, adsorbent chromium oxide catalyst.

10. A process for the preparation of a chromium oxide catalyst suitable for the catalytic conversion of hydrocarbons at elevated temperatures, which comprises effecting an intimate dispersion of hydrous chromium oxide in an aqueous medium containing agar in amount between 1 and 10 per cent of said hydrous chromium oxide, drying said dispersion at a temperature below the liquefaction temperature of the resulting mixture to form a hard, heat-stable gel, and subsequently drying said heat-stable gel at an elevated temperature, and finally burning out the dried material to remove organic material and produce a hard, porous, granular, adsorbent chromium oxide catalyst.

11. A process for the preparation of a zirconium oxide catalyst suitable for the catalytic conversion of hydrocarbons at an elevated temperature, which comprises effecting an intimate dispersion of hydrous zirconium oxide in an aqueous medium containing a hydrophilic organic colloid selected from the group consisting of gelatin, agar, gum arabic, and gum tragacanth, in an amount between approximately 1 and approximately 10 per cent by weight of said hydrous zirconium oxide, drying said dispersion at a temperature below the liquefaction temperature of the resulting mixture to form a hard, heat-stable gel, subsequently drying said heat-stable gel at an elevated temperature between approximately 600° and approximately 1000° F., and finally passing a gas containing reactive oxygen over the resultant dried material at a temperature between approximately 700° and approximately 1100° F. to oxidize and remove organic material and produce a hard, porous, granular, adsorbent zirconium oxide catalyst.

12. A process for the preparation of a zirconium oxide catalyst suitable for the catalytic conversion of hydrocarbons at elevated temperatures, which comprises effecting an intimate dispersion of hydrous zirconium oxide in an aqueous medium containing gelatin in amount between 1 and 10 per cent of said hydrous zirconium oxide, drying said dispersion at a temperature below the liquefaction temperature of the resulting mixture to form a hard heat-stable gel, and subsequently drying said heat-stable gel at an elevated temperature, and finally burning out the dried material to remove organic material and produce a hard, porous, granular, adsorbent zirconium oxide catalyst.

WALTER A. SCHULZE.
JOHN C. HILLYER.

CERTIFICATE OF CORRECTION.

Patent No. 2,337,628. December 28, 1943.

WALTER A. SCHULZE, ET AL.

It is hereby certified that error appears in the printed specification of the above numbered patent requiring correction as follows: Page 1, first column, line 41-42, for "formations" read --formation--; page 3, second column, line 74, for "lese" read --less--; page 4, first column, line 4, for "kaloin" read --kaolin--; and second column, line 18, for "one-half-inch" read --one-half inch--; page 5, second column, line 50, claim 8, for "absorbent" read --adsorbent--; page 6, first column, line 9, claim 10, after "temperature" strike out the comma; line 10, same claim, for "and finally burning out the dried material to" read --between 600 and 1000° F., and finally passing a gas containing reactive oxygen over the resultant dried material at a temperature between 700 and 1100° F. to oxidize and--; and second column, lines 20 and 21, claim 12, strike out "temperature, and finally burning out the dried material to" and insert instead --temperature between 600 and 1000° F., and finally passing a gas containing reactive oxygen over the resultant dried material at a temperature between 700 and 1100° F. to oxidize and--; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.